(12) United States Patent
Sato et al.

(10) Patent No.: US 11,029,477 B2
(45) Date of Patent: Jun. 8, 2021

(54) OPTICAL FIBER CABLE

(71) Applicant: SUMITOMO ELECTRIC INDUSTRIES, LTD., Osaka (JP)

(72) Inventors: Fumiaki Sato, Yokohama (JP); Yoshiaki Nagao, Yokohama (JP); Ryoei Oka, Yokohama (JP); Ken Takahashi, Yokohama (JP); Takao Hirama, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/496,037

(22) PCT Filed: Mar. 19, 2018

(86) PCT No.: PCT/JP2018/010788
§ 371 (c)(1),
(2) Date: Sep. 20, 2019

(87) PCT Pub. No.: WO2018/174004
PCT Pub. Date: Sep. 27, 2018

(65) Prior Publication Data
US 2020/0041739 A1    Feb. 6, 2020

(30) Foreign Application Priority Data

Mar. 21, 2017    (JP) .............................. JP2017-054532

(51) Int. Cl.
*G02B 6/44* (2006.01)
*G02B 6/02* (2006.01)

(52) U.S. Cl.
CPC .......... *G02B 6/441* (2013.01); *G02B 6/02395* (2013.01); *G02B 6/4403* (2013.01); *G02B 6/449* (2013.01)

(58) Field of Classification Search
CPC ... G02B 6/441; G02B 6/02395; G02B 6/4403
USPC ........................................................ 385/102
See application file for complete search history.

(56) References Cited

U.S. PATENT DOCUMENTS 5,345,525 A    9/1994  Holman et al.
5,561,729 A *  10/1996 Parris .................... G02B 6/4432
                                                            385/100
5,857,051 A *  1/1999  Travieso .............. G02B 6/4411
                                                            385/103

(Continued)

FOREIGN PATENT DOCUMENTS

EP         1558957 A1    8/2005
JP       H06-11634 A    1/1994
(Continued)

*Primary Examiner* — Kaveh C Kianni
(74) *Attorney, Agent, or Firm* — Faegre Drinker Biddle & Reath LLP

(57) ABSTRACT

Provided is an optical fiber cable that is easier to be laid and enables higher-density packaging than an existing cable. This optical fiber cable is a slotless type optical fiber cable including: an optical unit formed by collecting and twisting a plurality of optical fibers or ribbons each formed by arranging the plurality of optical fibers; a cable core housing the optical unit; and a cable jacket provided around the cable core, and a tension member made of a fiber body within the cable core.

7 Claims, 4 Drawing Sheets

(56) References Cited

U.S. PATENT DOCUMENTS

| | | | | | |
|---|---|---|---|---|---|
| 6,160,940 | A * | 12/2000 | Summers | G02B 6/4408 | 385/110 |
| 6,185,352 | B1 * | 2/2001 | Hurley | G02B 6/4413 | 385/114 |
| 6,256,439 | B1 * | 7/2001 | Brown | G02B 6/4411 | 385/110 |
| 6,449,412 | B1 * | 9/2002 | Rutterman | G02B 6/4404 | 385/100 |
| 6,519,396 | B2 * | 2/2003 | Schneider | G02B 6/4419 | 174/70 R |
| 6,731,844 | B2 * | 5/2004 | Conrad | G02B 6/4482 | 385/114 |
| 7,860,361 | B2 * | 12/2010 | Ginocchio | G02B 6/4494 | 385/102 |
| 7,936,957 | B1 * | 5/2011 | Puzan | G02B 6/4494 | 385/105 |
| 9,116,322 | B1 * | 8/2015 | Laws | G02B 6/4433 | |
| 9,188,754 | B1 * | 11/2015 | Risch | G02B 6/4401 | |
| 2002/0122640 | A1 * | 9/2002 | Strong | G02B 6/4411 | 385/114 |
| 2003/0113079 | A1 * | 6/2003 | Storaasli | G02B 6/441 | 385/111 |
| 2005/0111811 | A1 * | 5/2005 | Cooke | G02B 6/4465 | 385/136 |
| 2006/0165355 | A1 * | 7/2006 | Greenwood | G02B 6/4494 | 385/100 |
| 2009/0067791 | A1 * | 3/2009 | Greenwood | G02B 6/4494 | 385/114 |
| 2009/0190890 | A1 * | 7/2009 | Freeland | G02B 6/4433 | 385/111 |
| 2010/0189397 | A1 * | 7/2010 | Richard | G02B 6/02333 | 385/123 |
| 2011/0110635 | A1 * | 5/2011 | Toge | G02B 6/441 | 385/102 |
| 2013/0028563 | A1 * | 1/2013 | Matsuzawa | G02B 6/4482 | 385/120 |
| 2013/0084047 | A1 * | 4/2013 | Baucom | G02B 6/4404 | 385/114 |
| 2013/0163932 | A1 * | 6/2013 | Cooke | G02B 6/4472 | 385/76 |
| 2013/0343712 | A1 * | 12/2013 | Matsuzawa | G02B 6/4432 | 385/102 |
| 2014/0079361 | A1 * | 3/2014 | Smartt | G02B 6/4494 | 385/109 |
| 2015/0234139 | A1 * | 8/2015 | Cignarale | G02B 6/4405 | 385/114 |
| 2016/0299310 | A1 * | 10/2016 | Kaneko | G02B 6/44 | |
| 2017/0082813 | A1 * | 3/2017 | Cignarale | G02B 6/441 | |
| 2017/0235068 | A1 * | 8/2017 | Debban | G02B 6/4433 | 385/110 |

FOREIGN PATENT DOCUMENTS

| | | |
|---|---|---|
| JP | 2003-177288 A | 6/2003 |
| JP | 2003-329905 A | 11/2003 |
| JP | 2007-41568 A | 2/2007 |
| JP | 2010-8923 A | 1/2010 |
| JP | 2012-83418 A | 4/2012 |
| JP | 2014-109751 A | 6/2014 |
| JP | 2015-517679 A | 6/2015 |
| WO | WO-2013/165407 A1 | 11/2013 |

* cited by examiner

FIG.3

| | OCCUPANCY RATIO (%) | CABLE TRANSMISSION LOSS | CABLE BENDING LOSS |
|---|---|---|---|
| SAMPLE 1 | 15 | ○ | × |
| SAMPLE 2 | 25 | ○ | ○ |
| SAMPLE 3 | 35 | ○ | ○ |
| SAMPLE 4 | 45 | ○ | ○ |
| SAMPLE 5 | 55 | ○ | ○ |
| SAMPLE 6 | 65 | ○ | ○ |
| SAMPLE 7 | 75 | × | × |

OPTICAL FIBER CABLE

TECHNICAL FIELD

The present invention relates to a slotless type optical fiber cable in which a plurality of optical fibers or ribbons in which the plurality of optical fibers are arranged are covered with a cable jacket.

BACKGROUND ART

Construction of an optical network is in progress to cope with bidirectional communication and large capacity communication in addition to the speeding up of communication and the increase of an information amount caused by the spread of information communication such as the Internet. In the optical network, FTTH (Fiber To The Home) that provides a high-speed communication service by directly connecting a telecommunications carrier and each home by an optical fiber is started. As the optical fiber is drawn to such a subscriber's home and campus network is expanded, there is an increasing demand for wiring work in which the optical fiber is split from a middle portion of an optical fiber cable storing the plurality of optical fibers (referred to as intermediate splitting of the optical fiber) and is distributed to a plurality of homes and terminals.

In order to make it easy to take out the optical fiber at the time of performing the intermediate splitting of the optical fiber, the optical fiber may be stored in a loose tube divided into colors. For example, a structure of a loose tube type optical fiber cable is disclosed in Patent Literature 1. Further, a structure of a slotless type optical fiber cable is disclosed in Patent Literature 2.

CITATION LIST

Patent Literature

Patent Literature 1: JP-A-2015-517679
Patent Literature 1: JP-A-2010-8923

SUMMARY OF INVENTION

Technical Problem

However, in the case of the loose tube type as described in Patent Document 1, since a space for a loose tube itself is required in the optical fiber cable and a space between the loose tubes becomes a dead space, high density mounting becomes difficult.

On the other hand, in the case of the slotless type as described in Patent Document 2, even though the high density mounting is possible, a tension member is not disposed at a central position but is disposed at two positions within a cable jacket, bending directionality occurs in the optical fiber cable, thereby making it difficult to lay the cable.

The present invention has been made in consideration of the above-described circumstances, and an object thereof is to provide an optical fiber cable which can be easily laid and can achieve high density mounting in comparison with a cable of a related art.

Solution to Problem

A slotless type optical fiber cable according to one aspect of the present invention includes: an optical unit that is formed by collecting and twisting a plurality of optical fibers or ribbons in which the plurality of optical fibers are arranged; a cable core that accommodates the optical unit; a cable jacket that is provided around the cable core; and a tension member made of a fiber body in the cable core.

Advantageous Effects of Invention

According to the above description, the present invention can be easily laid, and can achieve high density mounting in comparison with a cable of a related art.

BRIEF DESCRIPTION OF DRAWINGS

FIG. 3 is a table for describing an evaluation result of a transmission characteristic of an optical fiber.

DESCRIPTION OF EMBODIMENTS

Description of Embodiments

Figure 1:
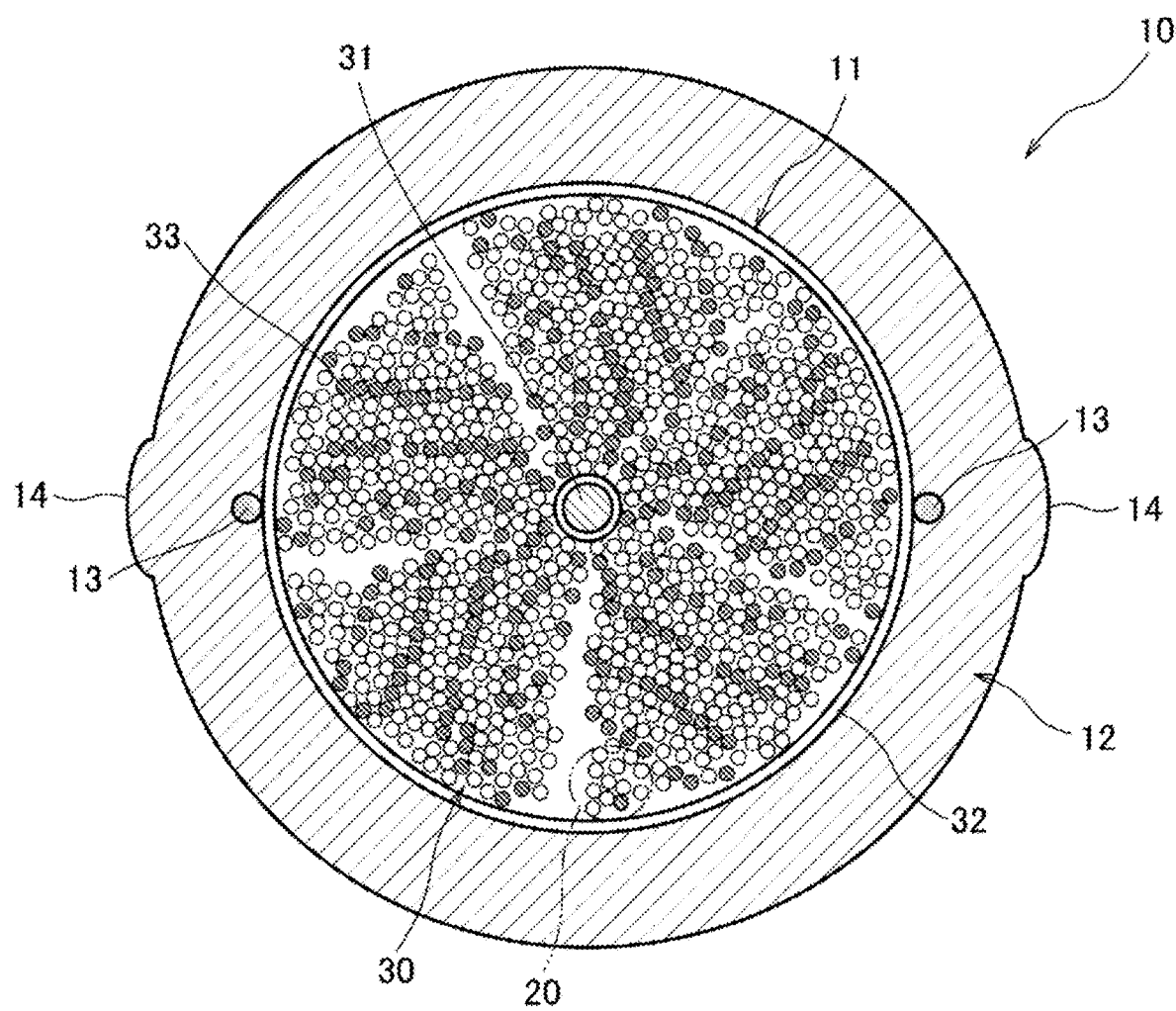
FIG. 1 is a diagram illustrating an example of an optical fiber cable according to a first embodiment of the present invention.

First, contents of embodiments of the present invention will be listed and described.

(1) A slotless type optical fiber cable according to one aspect of the present invention includes: an optical unit that is formed by collecting and twisting a plurality of optical fibers or ribbons in which the plurality of optical fibers are arranged; a cable core that accommodates the optical unit; a cable jacket that is provided around the cable core; and a tension member made of a fiber body in the cable core. Since a structure of the optical fiber cable is a slotless type, high density mounting is possible in comparison with a cable of a related art. Further, since the tension member made of the fiber body is disposed in the cable core, it is possible to provide an optical fiber cable which has no bending directionality and can be easily laid in a pipeline in comparison with a cable of a related art.

(2) The fiber body is disposed at a central position of the cable core, and an occupancy ratio of the optical unit calculated from a cross sectional area of the optical unit with respect to a cross sectional area of the cable core is equal to or greater than 25% or equal to or less than 65%. When the occupancy ratio is equal to or less than 65% in a state where the optical unit is twisted, it is difficult to apply side pressure to the optical fiber, and thus cable transmission loss can be improved. Further, since compression strain is dispersed even though the cable is bent in a circular arc shape, cable bending loss can also be improved. On the other hand, when the occupancy ratio of the twisted optical unit is equal to or greater than 25%, even though the cable is bent in a circular arc shape, since it is difficult for the fiber body to move toward the bending center of the cable and a phenomenon in which a part of the optical fiber is pinched by the fiber body hardly occurs, it can be seen that the cable bending loss can be improved.

(3) The optical unit is formed of a plurality of subunits formed by twisting the plurality of ribbon, and a plurality of glass fiber bodies are filled as the fiber body around the subunit. Since the fiber bodies are disposed approximately uniformly around the optical unit, it is possible to provide an optical fiber cable which has no bending directionality and can be easily laid in a pipeline. Further, since the glass fiber body is used, the weight reduction of the cable can be achieved in comparison with a case where a metal tension member is provided.

(4) The fiber body is formed of a glass fiber or an aramid-based fiber. The weight reduction of the cable can be achieved in comparison with a case where a metal tension member is provided.

(5) The glass fiber body is an optical fiber not contributing to transmission. Cost reduction can be realized by using a defective optical fiber.

(6) The optical unit is formed of the ribbon, and the ribbon is an intermittent ribbon in which a connection part and a non-connection part are intermittently formed in the longitudinal direction between the optical fibers adjacent to each other. Since the intermittent ribbon has flexibility in comparison with a general ribbon, the occupancy ratio can be increased by forming the optical unit with the intermittent ribbon.

(7) Water absorbing powder is applied to the tension member. It is possible to prevent water from flowing into the cable core by applying the water absorbing powder thereto.

(8) The optical fiber is formed with a coating outer diameter applied to the glass fiber in the range of 135 µm to 220 µm. The use of a small diameter fiber makes high density mounting easier.

DETAILS OF EMBODIMENTS

Hereinafter, desirable embodiments of an optical fiber cable according to the present invention will be described with reference to the accompanying drawings.

Figure 2A:
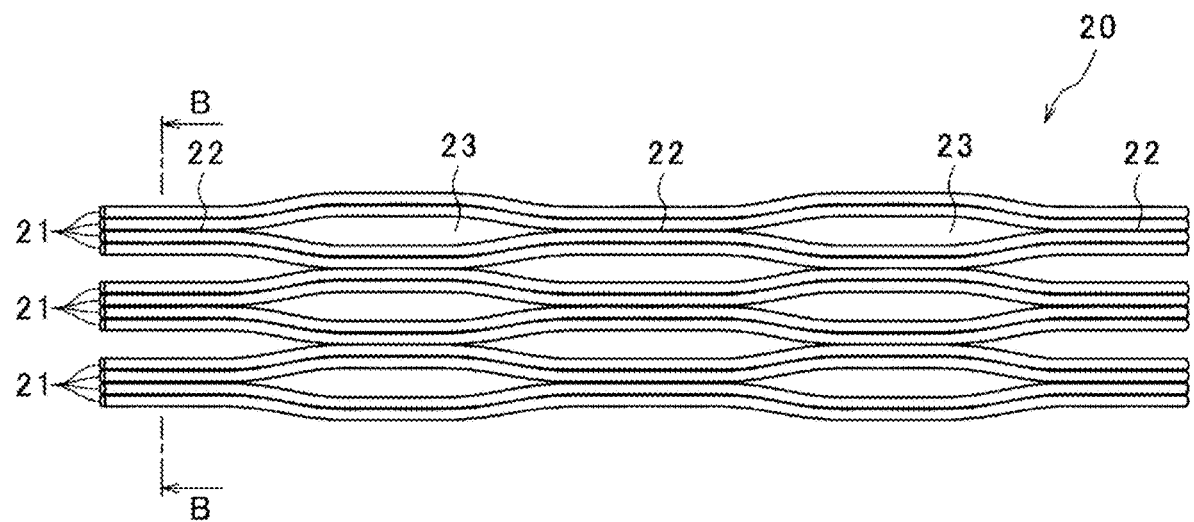
FIGS. 2A and 2B are diagrams illustrating an example of a structure of an intermittent ribbon.
Figure 2B:
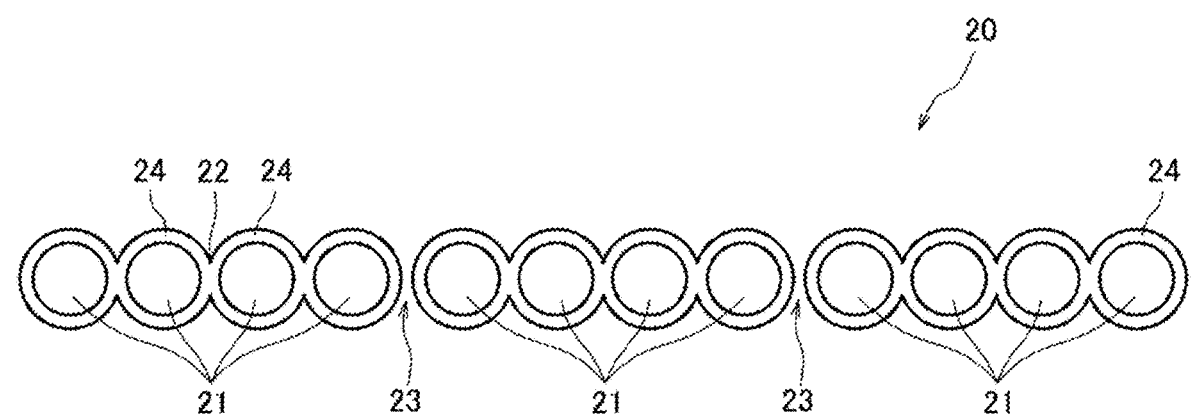

FIG. 1 is a diagram illustrating an example of an optical fiber cable according to a first embodiment of the present invention, and FIGS. 2A and 2B are diagrams illustrating an example of a structure of an intermittent ribbon.

An optical fiber cable 10 illustrated in FIG. 1 is a slotless type, and includes, for example, a round cable core 11 and a cable jacket 12 formed around the cable core 11.

The cable core 11 accommodates, for example, 1728 cores using 144 pieces of the intermittent ribbons 20 of 12 cores.

In the intermittent ribbon, a plurality of optical fibers are arranged in a parallel line, and the optical fibers adjacent to each other are intermittently connected by a connection part and a non-connection part. FIG. 2A illustrates a state in which the intermittent ribbon is opened in the arrangement direction; and FIG. 2B respectively illustrates a cross sectional view taken along the line B-B of FIG. 2A. The illustrated intermittent ribbon 20 is formed in such a manner that the ribbons of 12 cores are intermittently connected to each other every two cores.

As illustrated in FIG. 2B, a ribbon coating 24 made of an ultraviolet curing resin is provided around each optical fiber 21, and for example, core wires integrated with two cores are intermittently connected by a connection part 22 and a non-connection part 23. In the connection part 22, the ribbon coatings 24 are connected to each other, and in the non-connection part 23, the ribbon coatings 24 adjacent to each other are separated without being connected to each other. Further, the intermittent ribbon may not be provided with the connection part and the non-connection part every two cores, and for example, may be intermittently connected with the connection part and the non-connection part every one core.

For example, the optical fiber 21 accommodated in the intermittent ribbon is further coated with coloring on the outside of what is referred to as an optical fiber which is coated with a coating outer diameter of about 250 µm on a glass fiber with a standard outer diameter of 125 µm, but is not limited thereto, and may be a small diameter fiber having a coating outer diameter in the range of 135 µm to 220 µm, for example, about 165 µm or 200 µm. The use of a small diameter fiber makes high density mounting easier.

A subunit 33 illustrated in FIG. 1 is a 96-core unit formed by, for example, collecting 8 pieces of the intermittent ribbons 20 of 12 cores and twisting the collected intermittent ribbons 20 in a spiral shape, and an optical unit 30 formed by, for example, collecting 18 pieces of the subunits 33 and twisting the collected subunits 33 in a spiral shape is accommodated in the cable core 11. The intermittent ribbon 20 is more flexible than a general ribbon, and when the optical unit 30 is formed of the intermittent ribbon, an occupancy ratio of the optical fiber 21 can be increased. Further, such an intermittent ribbon may not be used as the ribbon which forms the optical unit 30, and a connected type ribbon may be used, or one in which a plurality of single core optical fibers are arranged may be used.

The occupancy ratio of the optical unit 30 is calculated from a total cross-sectional area of the optical unit 30 with respect to a cross-sectional area of the cable core 11. Further, the total cross-sectional area of the optical unit 30 also includes a cross-sectional area of the ribbon coating 24 described in FIG. 2.

Further, the intermittent ribbon 20 and the subunit 33 may be twisted in an SZ shape, which is periodically reversed, in addition to the spiral shape in one direction.

Further, a tension member 31 made of a fiber body is also accommodated in the cable core 11. One tension member 31 illustrated in FIG. 1 is disposed at a central position of the optical unit 30 along the longitudinal direction of the optical unit 30. Further, the optical unit 30 of the embodiment is formed by twisting and collecting the subunits 33 around the tension member 31.

The tension member 31 is formed of a nonmetallic material such as, for example, a glass fiber reinforced plastic (GFRP) formed of a glass fiber and an aramid fiber reinforced plastic (AFRP, KFRP) formed of an aramid-based fiber as a wire having resistance against tension and compression. Thus, the weight reduction of the cable can be achieved in comparison with a case where a metal tension member is provided. Further, since the cable is light in weight, it is difficult to apply side pressure to the optical fiber in the cable core 11. Further, water absorbing powder may be applied to the tension member 31 in order to stop water from flowing into the cable core 11.

On the other hand, the cable core 11 is formed as a round shape by vertically placing or horizontally winding the optical unit 30 with a press-winding tape 32. A non-woven fabric including, for example, polyethylene terephthalate (PET) is used for the press-winding tape 32 and is wound around from the outside of the optical unit 30.

The outer side of the press-winding tape 32 is covered with the cable jacket 12 formed of, for example, PE (polyethylene) and PVC (polyvinyl chloride).

A tear string 13 for tearing the cable jacket 12 in the longitudinal direction of the cable is embedded in the cable jacket 12 when the cable jacket 12 is extruded. The tear strings 13 are provided one by one on opposite sides of the cable core 11, for example, with the cable core 11 interposed therebetween. The tear string 13 is, for example, a string-like member such as nylon and polyester. Further, a projection part 14 may be formed on the cable jacket 12 at the time of extrusion molding so that the embedded position of the tear string 13 can be visually recognized from the outside.

According to the optical fiber cable according to the first embodiment, since the optical fiber cable has the slotless type structure, the high density mounting can be achieved.

Further, since the tension member 31 made of the fiber body is disposed at the central position of the cable core 11, it is possible to provide an optical fiber cable which has no bending directionality and can be easily laid in a pipeline. Further, since the plurality of subunits 33 are twisted and collected around the tension member 31, even though the cable is bent, it is difficult for the tension member 31 to move toward the bending center of the cable, and it is difficult to apply the side pressure to the optical fiber.

FIG. 3 is a table for describing an evaluation result of a transmission characteristic of an optical fiber.

In the evaluation of the transmission characteristic, the influence of side pressure applied to the optical fiber (hereinafter referred to as "cable transmission loss") and the influence of compression strain applied to the optical fiber (hereinafter referred to as "cable bending loss") are evaluated.

In the former evaluation of the cable transmission loss, the transmission loss (measurement wavelength 1550 (nm)) is measured by changing the occupancy ratio of the optical unit 30 with respect to several samples of the cable 10 in a straight line state. Then, among the measured several samples, a case where the maximum value of the transmission loss is less than 0.3 (dB/km) is determined to be good (◯) and a case where the maximum value thereof is not less than 0.3 (dB/km) is determined to be defective (×).

When the occupancy ratio of the optical unit 30 is 15% (referred to as a "sample 1"), the maximum value of the transmission loss becomes 0.19 dB/km, which is determined to be good.

The occupancy ratio is changed and when the occupancy ratio is 25% (referred to as a "sample 2"), the maximum value of the transmission loss becomes 0.19 dB/km; when the occupancy ratio is 35% (referred to as a "sample 3"), the maximum value of the transmission loss becomes 0.20 dB/km; when the occupancy ratio is 45% (referred to as a "sample 4"), the maximum value of the transmission loss becomes 0.20 dB/km; when the occupancy ratio is 55% (referred to as a "sample 5"), the maximum value of the transmission loss becomes 0.21 dB/km; and when the occupancy ratio is 65% (referred to as a "sample 6"), the maximum value of the transmission loss becomes 0.23 dB/km, all of which are determined to be good.

On the other hand, when the occupancy ratio of the optical unit 30 is 75% (referred to as a "sample 7"), the maximum value of the transmission loss becomes 0.45 dB/km which is greater than 0.3 dB/km, such that this case is determined to be defective.

Thus, it can be seen that when the occupancy ratio is equal to or less than 65% in a state where the optical unit is twisted, it is difficult to apply the side pressure to the optical fiber and thus the cable transmission characteristic can be improved.

In the latter evaluation of the cable bending loss, the samples 1 to 7 are wound around a rod-like member (a member whose diameter is about 10 times the outer diameter of the cable) for one turn, and a case where the increase of the transmission loss (measurement wavelength 1550 (nm)) after one turn becomes equal to or less than 0.1 (dB) at the maximum with respect to the transmission loss in a straight line state is determined to be good (◯), whereas if not, the case is determined to be defective (×).

In the case of the sample 2, the maximum value of the bending loss becomes 0.1 dB, which is determined to be good.

Further, in the case of the sample 3, the maximum value of the bending loss becomes 0.07 dB; in the case of the sample 4, the maximum value of the bending loss becomes 0.06 dB; in the case of the sample 5, the maximum value of the bending loss becomes 0.06 dB; and in the case of the sample 6, the maximum value of the bending loss becomes 0.08 dB, all of which are determined to be good.

On the other hand, in the case of the sample 1, since the maximum value of the bending loss becomes 0.3 dB which becomes greater than 0.1 dB, this case is determined to be defective. Further, in the case of the sample 7, since the maximum value of the bending loss is 0.15 dB, this case is determined to be defective.

Accordingly, when the occupancy ratio is equal to or less than 65%, as described above, it is difficult to apply the side pressure to the optical fiber, but since the compression strain is dispersed even though the cable is bent in a circular arc shape, the cable bending characteristic can be also improved. Further, when the occupancy ratio of the twisted optical unit 30 is equal to or greater than 25%, even though the cable is bent in a circular arc shape, since it is difficult for the tension member 31 to move toward the bending center of the cable and a phenomenon in which a part of the optical fiber is pinched by the tension member 31 hardly occurs, it can be seen that the cable bending characteristic can be improved.

Figure 4:
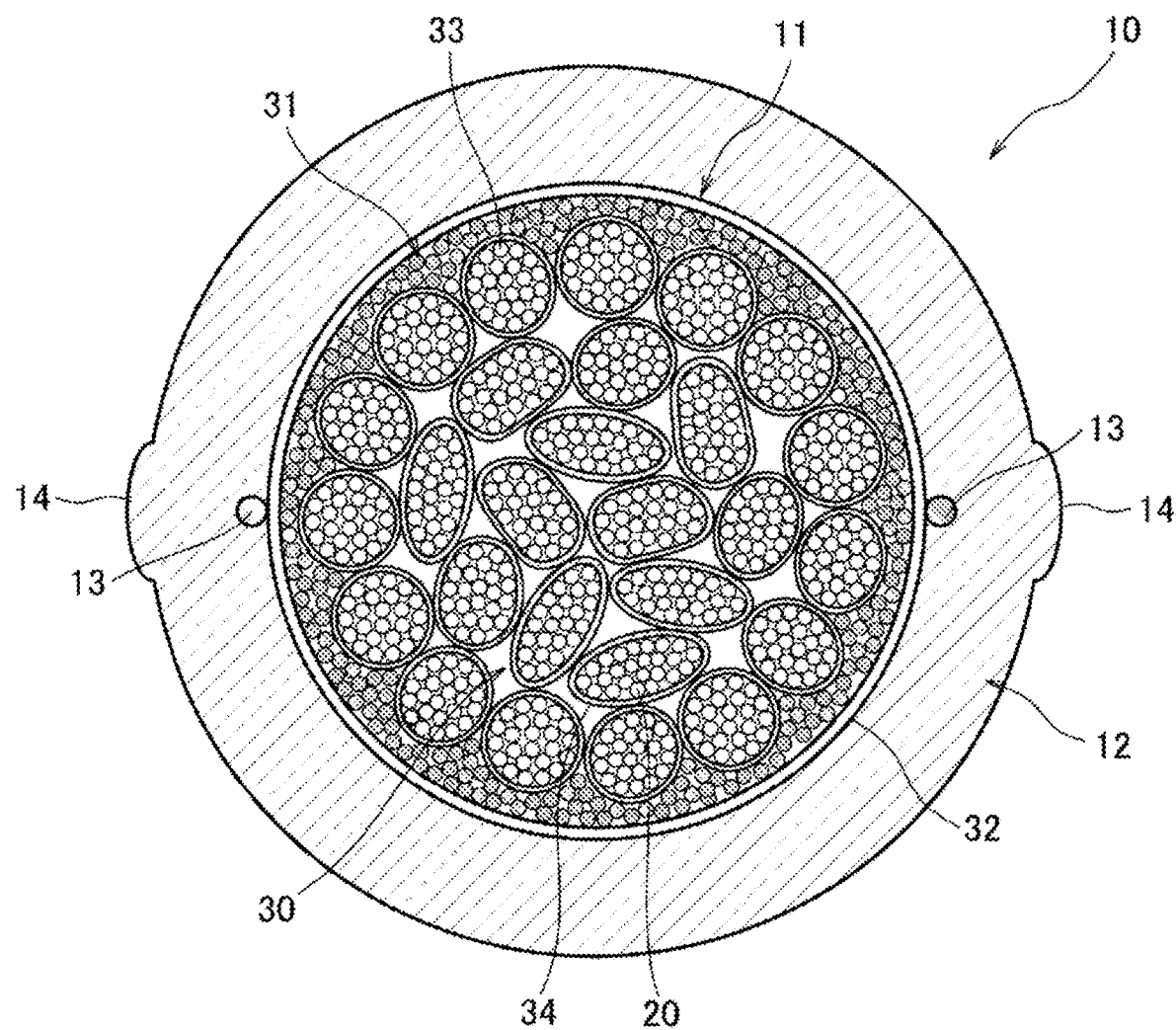
FIG. 4 is a diagram illustrating an example of an optical fiber cable according to a second embodiment of the present invention.

FIG. 4 is a diagram illustrating an example of an optical fiber cable according to a second embodiment of the present invention.

The optical fiber cable 10 illustrated in FIG. 4 is also a slotless type, and includes, for example, the round cable core 11.

The subunit 33 is formed by, for example, twisting and collecting the intermittent ribbon 20 in a spiral shape, and is bundled by a bundle material 34 for identification. The optical unit 30 formed by, for example, collecting the plurality of the subunits 33 and twisting the collected subunits 33 in a spiral shape is accommodated in the cable core 11.

Further, the tension member 31 made of a fiber body is also accommodated in the cable core 11, and the plurality of tension members 31 illustrated in FIG. 4 are vertically disposed along the longitudinal direction of the optical unit 30 at the outside position of the optical unit 30. The tension member 31 is formed of a glass fiber such as, for example, an optical fiber not contributing to transmission as a wire having resistance against tension and compression. Further, the configuration of the cable jacket 12 is the same as that of the first embodiment, and the detailed description thereof will be omitted.

The optical fiber cable according to the second embodiment has the same slotless structure as that of the first embodiment, thereby making it possible to achieve the high density mounting.

Further, since the tension member 31 made of a fiber body is disposed approximately uniformly at the outside position of the optical unit 30 in the cable core 11, it is possible to provide an optical fiber cable which has no bending directionality and can be easily laid in a pipeline.

The embodiments disclosed herein should be considered to be illustrative and non-restrictive in all respects. The scope of the present invention is indicated not by the above-described meaning but by the claims, and is intended to include all modifications in the meaning equivalent to the scope of the claims and within the scope of the claims.

REFERENCE SIGNS LIST

10: optical fiber cable
11: cable core
12: cable jacket
13: tear string
14: projection part
20: intermittent ribbon
21: optical fiber
22: connection part
23: non-connection part
24: ribbon coating
30: optical unit
31: tension member
32: press-winding tape
33: subunit

The invention claimed is:

1. A slotless type optical fiber cable, comprising:
an optical unit formed by collecting and twisting a plurality of ribbon in which a plurality of optical fibers are arranged;
a cable core that accommodates the optical unit;
a cable jacket provided around the cable core; and
a tension member made of a fiber body in the cable core,
wherein the optical unit is formed of the ribbon, and the ribbon is an intermittent ribbon in which a connection part and a non-connection part are intermittently formed in the longitudinal direction between the optical fibers adjacent to each other.

2. The optical fiber cable according to claim 1, wherein the fiber body is disposed at a central position of the cable core, and
an occupancy ratio of the optical unit calculated from a cross sectional area of the optical unit with respect to a cross sectional area of the cable core is equal to or greater than 25% or equal to or less than 65%.

3. The optical fiber cable according to claim 1, wherein the optical unit is formed of a plurality of subunits formed by twisting the plurality of ribbon, and
a plurality of glass fiber bodies are filled as the fiber body around the subunit.

4. The optical fiber cable according to claim 3, wherein, the glass fiber body is an optical fiber not contributing to transmission.

5. The optical fiber cable according to claim 1, wherein the fiber body is formed of a glass fiber or an aramid-based fiber.

6. The optical fiber cable according to claim 1, wherein water absorbing powder is applied to the tension member.

7. The optical fiber cable according to claim 1, wherein the optical fiber is formed with a coating outer diameter applied to a glass fiber in the range of 135 μm to 220 μm.

* * * * *